United States Patent
Commercon et al.

[15] 3,679,968
[45] July 25, 1972

[54] METHOD AND DEVICE FOR MEASURING THE THICKNESS OF A METAL DEPOSIT ON AN INSULATING SUPPORT

[72] Inventors: Jean Claude Commercon, 35 Chemin des Petites Brosses, 69 Caluire; Guy Berthier, Avenue Posteur, 01 Saint Maurice de Beynost, both of France

[22] Filed: March 16, 1970

[21] Appl. No.: 19,933

[52] U.S. Cl. .................................................. 324/34 TK
[51] Int. Cl. .................................................. G01r 33/12
[58] Field of Search ............................. 324/34 TK, 40

[56] References Cited

UNITED STATES PATENTS

| | | | |
|---|---|---|---|
| 3,077,858 | 2/1963 | Ulug | 324/34 TK |
| 2,545,576 | 3/1951 | Godley | 324/34 TK |
| 2,676,298 | 4/1954 | Frommer | 324/34 TK |

FOREIGN PATENTS OR APPLICATIONS 1,083,231   9/1967   Great Britain ..................... 324/34 TK

*Primary Examiner*—Rudolph V. Rolinec
*Assistant Examiner*—R. J. Corcoran
*Attorney*—M. Smolowitz

[57] ABSTRACT

Plastic film is drawn from a spool and passes around a drum in a vacuum chamber in such a way that the film is exposed to metal vapor which is deposited thereon in thickness ranging from 50 angstroms to several microns. The metallized film then passes around guide rollers and is wound on a reel. One of the guide rollers comprises a novel hermetically sealed shell of electrical insulating material containing novel detectors which are responsive to the thickness of the metal coating on the film. Such detectors consist of coreless induction coils, each constituting the tuning element of a unique stabilized oscillating circuit, the voltage of which is a very accurate measure of the relative thickness of the metal coating on the film by virtue of the eddy currents induced therein.

3 Claims, 2 Drawing Figures

INVENTOR.
JEAN CLAUDE COMMERÇON
GUY BERTHIER

BY Martin Smolowitz

ATTORNEY

METHOD AND DEVICE FOR MEASURING THE THICKNESS OF A METAL DEPOSIT ON AN INSULATING SUPPORT

This invention relates to the continuous production of metallized plastic film and more particularly to the art of measuring the thickness of a metal deposit on an insulating support.

The principle is known which consists in measuring the variations in current of an induction circuit which causes the appearance of eddy currents in a continuously metallized sheet, the amount of which currents is a function, inter alia, of the thickness of the metallization layer and the presence of which causes measurable losses in the induction circuit.

It is also known to form a free running oscillator the coil of which is coupled with the metallized layer, measuring the variations in frequency under the influence of the reactance reflected in the coil by the metallized film. Such measurement gives results which can be suitable when large thicknesses are measured; but its degree of precision is insufficient for small thicknesses of the order of a few microns, as is true of metallized films.

By connecting the induction coil to a source of high-frequency voltage modulated by a substantially constant amplitude, and connecting it to a capacitor, one can also create a resonant circuit which is charged by the reactance reflected in the coil by the metallized film, causing variations of amplitude and frequency in the circuit which form a measure of the thickness of metal deposited. Such method, which is of complicated technique, also lacks sensitivity for slight thicknesses.

The known methods used up to the present time have drawbacks which limit their interest. Some of them employ the change of frequency of a piezoelectric crystal but such method takes into account only what happens locally, which limits the quality of the information in case of metallization in large width. Other methods effect the direct measurement by means of electrodes of the surface electric resistance, but the production of proper electric contacts has always left much to be desired, particularly at high speeds of travel. One proceeds also by measuring the optical opaqueness of the metallized films, but such method is relatively insensitive on both sides of a small range of thicknesses of deposit; it furthermore requires sensitive apparatus on both sides of the film, and the measures are rapidly falsified by the condensation of metallic vapors on the instruments.

The main object of the present invention is to provide apparatus which avoids such drawbacks, which does not involve direct contact with the film, the vital members of which are protected from the metal vapors, which can measure the thickness of thin layers or thick layers, which is also suitable in the case of double-sided metallization, both on small and on large widths. This invention permits the control of one or more operating parameters of a continuous metallization machine as a function of the thickness of the layer measured. It makes it possible also to measure both the opaqueness of the metal deposit and its resistance per unit of surface or its thickness.

According to the invention there is provided a free running oscillator whose coreless detector coil, which gives rise to eddy currents in the continuously metallized film constitutes the tuning element, the input voltage of the oscillating circuit being stabilized by a suitable device, and measuring the overvoltage caused in this induction circuit by the variations in the induced current resulting from variations in thickness of the deposited metal. This makes it possible to carry out correct, faithful, stable measurements within a range of square ohmic surface resistance extending from a few hundredths of an ohm to about a thousand ohms, which corresponds, depending on the materials, to thicknesses ranging from about 50 angstroms to several microns.

The invention comprises measuring a factor Q of an oscillating circuit consisting of a source of voltage, of an induction coil (L), and of a capacitor (C). The factor Q of the circuit in which (L) is the self-inductance of the induction coil and (C) is the capacitance of the capacitor is a function of (L), (C) and the characteristics of the probe, and is measured by the ratio $Uc/e$, $Uc$ being the voltage at the terminals of the capacitor and e the voltage given off by the voltage source. If one maintains e constant, the factor Q will vary as a function of the load of the induction coil.

The latter, due to the currents induced in the conductive layer, behaves in fact as the primary of a perfect transformer of which the metallized film is the secondary. This load in accordance with the classical theory of perfect transformers, can be considered equivalent to a fictitious series resistance in the circuit of the coil, which accordingly modifies the overvoltage coefficient which is represented by factor Q. Any variation of the thickness of the metal deposit which will result in a variation of the currents induced within the layer will, therefore, produce an equivalent variation of the fictitious resistance of the primary of the transformer formed, as stated, of the coil and film and therefore, of the overvoltage coefficient Q of this circuit.

IN THE DRAWING

Figure 1:
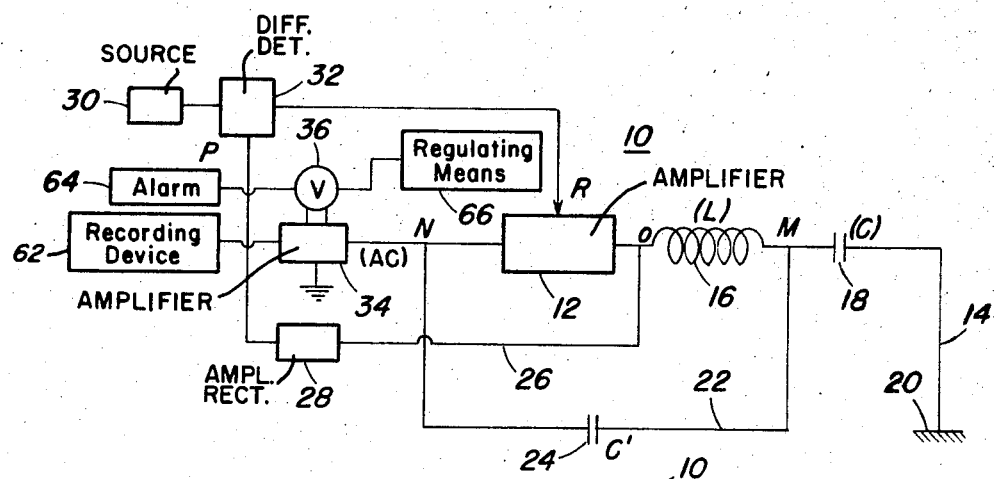
FIG. 1 is a circuit diagram illustrative of the invention.

As shown in FIG. 1, the circuit 10 includes a variable-gain amplifier 12 of conventional type, servo-controlled, having relatively low impedances. An oscillating circuit 14 composed of a coreless induction coil 16 and its tuning capacitor 18 is connected to the amplifier 12 and ground 20. The oscillator return loop 22 includes a capacitor 24 of very low impedance compared to that of capacitor 18, making negligible the value of the resistance introduced in series with coil 16, while maintaining the desired oscillation in the system. A control circuit 26 is provided comprising a stable-gain amplifier-rectifier 28, a highly stabilized voltage ($e'$) source 30, and a difference (E) detector 32. The latter produces a control signal which is applied at R in order to continuously modify the gain of amplifier 12 and stabilize the voltage at O.

Another amplifier 34 of high input impedance is connected at N to circuit 22 and associated with a direct current voltmeter 36 which serves to indicate the voltage ($Uc$) and therefore the factor Q since the voltage at O is kept constant.

Figure 2:
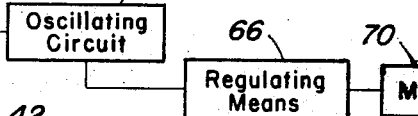
FIG. 2 is a flow diagram of a plastic film metallizing and metal coating thickness measuring control system incorporating the invention.
Figure 2:
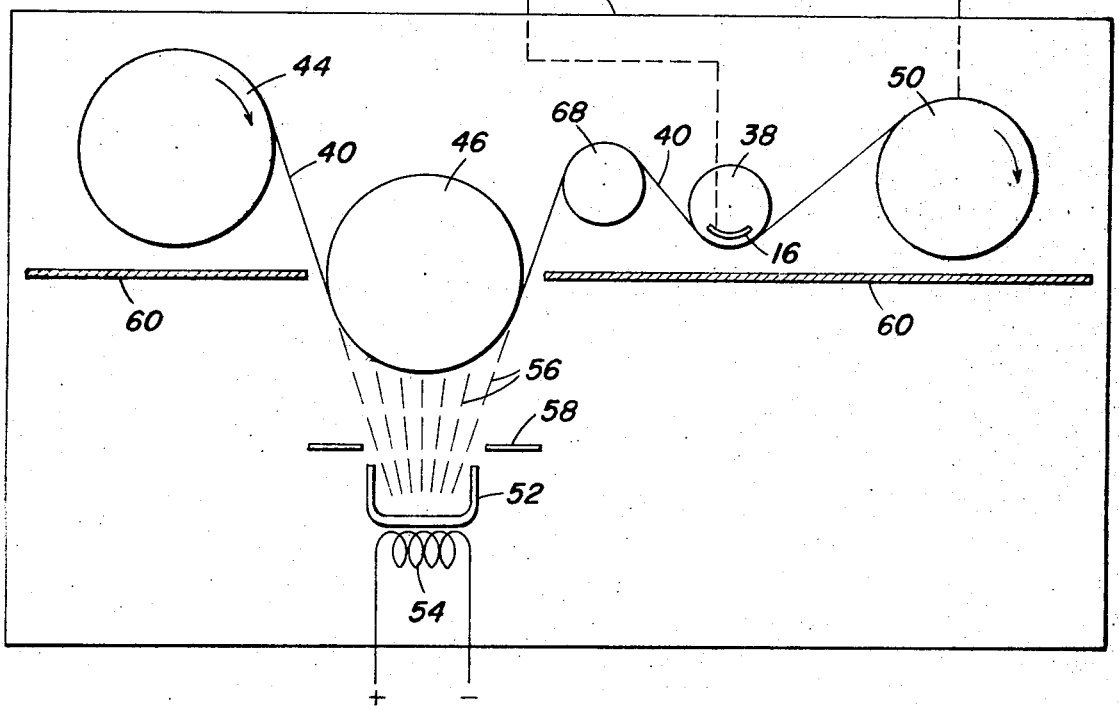

In this apparatus, the induction coil 16 constitutes a detector element shown in 44, FIG. 2 and is provided with no core, since the presence of a core while increasing the value of the factor Q, would decrease the temperature stability and therefore, the sensitivity of the apparatus. The dimensions and number of turns of the coil 16 are determined by the conditions of use, such as value of the resistance, sensitivity and operating frequency.

The stabilized voltage at O constitutes a high-frequency feed, the precision of the stabilization of which is a function essentially of the thermal stability; it must be of the order of $10^{-3}$ at 23°C ± 1°. The operating frequency can be between 1KHz and 10 MHz per second, the choice of the frequency being determined by the necessity of eliminating parasitic influences, by the desired sensitivity which is a function of the frequency, and by conveniences of construction.

The calibrating of the device 10 is effected by a study of the discrete values of the reactions between the induction coil 16 and the metallized layer, which makes it possible for instance, with the assistance of a computer, to plot a calibration curve of the factor Q as a function of the resistance per unit of surface.

The detection elements 16 are arranged within a hermetic, hollow insulating roller 38, FIG. 2, which turns freely under the effect of the passage of a film 40 freshly metallized by the technique of vacuum metallization.

In accordance with this technique, a vacuum chamber 42 is provided within which there is arranged a film supply roller spool 44 of the plastic film 40 to be metallized. The film 40 passes around a metallization drum 46 and tnen, after passage around the guide roller 68 and roller 38, is rewound on reel 50. In the lower part of the enclosure 42 there is arranged a crucible 52 heated by a resistor 54 in which a metal is evaporated. The metallization vapors 56, guided by a diaphragm 58, condense on the film 40 at the drum 46. A screen 60 has the effect of preventing metal condensations occurring elsewhere than at the desired place on the other parts arranged in the enclosure.

In accordance with the invention, the film guide roller 38 comprises a hermetically sealed hollow shell of electrically insulating material. Within this roller 38, there are arranged side by side the number of detectors 16 required to cover substantially the total width of the moving film 40. The detectors 16 are preferably miniaturized coils of the overvoltage measuring device described above which have been curved to the radius of curvature of the roller 38 which encloses them so that each detector 16 is arranged at a small distance of about 1 cm from the unwinding freshly metallized film 40. These detectors 16 are connected by means of connections arranged in the hollow axis of the roller which contains them, to the amplifiers and other elements which constitute the device in accordance with the invention. Any possible variations in temperature which may disturb the measurements are combatted by thermostating the enclosure or else by automatic variation of the characteristics of the components.

The plotting of calibration curves verified by the measurement of the optical densities makes it possible to show that the variations in the factor Q are closely and precisely related to the variations in ohmic resistance which themselves are a function of the variations in thickness of the metallization layer.

The precise plotting of these calibration curves makes it possible to define the index instruction values of the factor Q adapted to assure precise characteristics of the layer in accordance with the specifications of the applications contemplated.

Known control devices of any kind can be controlled by the apparatus described, among which are a device 62, FIG. 1, for the graphical recording of the measured variations of the overvoltage, an alarm 64 for emitting an alarm signal when the characteristics move outside fixed tolerances, or regulating means 66, the error voltage between the average index value selected and the instantaneous value controlling, for instance, the speed of passage, the power of evaporation of the metal, or any other manufacturing parameter. The invention makes it possible in particular instantaneously to control the start of the metallization operation and therefore, to limit the manufacturing waste and assure the proper homogeneity thereof.

In operation, plastic film 40 is drawn from spool 44 and passes under drum 46 in the vacuum chamber 42, so that the film 40 is exposed to the metal vapor 56 which is deposited thereon in thickness ranging from 50 angstroms to several microns. The metallized film 40 then passes above guide roller 68, under roller 38 and is finally wound on the reel 50. The reel 50 is driven by a motor 70, the speed of which is under the control of the regulating means 66. The detectors 16 in the roller 38 cause the circuit 10 to be responsive to the thickness of the metal deposit on the film 40 by virtue of the eddy currents induced therein, and the speed of the reel 50 is charged accordingly by the operation of regulating means 66 with respect to reel drive motor 70. For example, the speed of film 40 is automatically increased when the metal layer tends to increase in thickness; or decreased when the metal film 40 tends to decrease; whereby the thickness of the metal layer on the film 40 is kept constant.

In this apparatus, the detector consists of an induction coil 16 without core, since the presence of a core, while increasing the value of the factor Q, would decrease the temperature stability and therefore, the sensitivity of the apparatus. The dimensions and the number of turns of the coil are predetermined by the conditions of use:—value of the resistance, sensitivity, and operating frequency.

The invention can be used to effect other kinds of verifications and adjustments, the application of the invention to vacuum metallization of films of plastic material constituting however, a preferred embodiment of the invention.

What is claimed is:

1. Apparatus for measuring variations of the thickness of an electrically conductive layer on a continuously moving film, said apparatus comprising:
   an oscillating circuit including a variable-gain amplifier with a relatively low output impedance and having an output connected to a self-induction coil and a tuning capacitor connected in series circuit relationship, said coil and said capacitor forming the tuning elements of said oscillating circuit, said self-induction coil being disposed with respect to said conductive layer on said film such that the current which flows in said self-induction coil develops eddy currents withing the conductive layer,
   a vacuum enclosure,
   a freely rotating roller of electrically insulating material within said enclosure, said coil being arranged in said vacuum enclosure within said freely rotating roller, said roller being in contact with the film after deposition of the conductive layer thereon,
   A feed-back loop in said oscillating circuit connected to the junction between said coil and said capacitor and the input of said variable gain amplifier and including a second capacitor returned to the input of said variable gain amplifier for sustaining the oscillations of said oscillating circuit,
   a control circuit including a stable-gain amplifier-rectifier connected to the output of said variable gain amplifier,
   a stabilized voltage source,
   a difference voltage detector connected to the output of said stable-gain amplifier-rectifier and to said stabilized voltage source, the output of said detector being connected to said variable-gain amplifier in order to continuously modify the gain thereof and to maintain its output voltage constant,
   a high input impedance amplifier means connected to said feedback loop,
   indicating means connected to said amplifier means for indicating the output voltage variations of said loop, said output variations being representative of the relative amount of said eddy currents induced in the conductive layer by said coil,
   the voltage indicated by said indicating means being a measure of the thickness of the conductive layer on said film,
   regulating means connected to the output of said indicating means,
   and means connected to said regulating means for adjusting the rate of movement of said film in response to the output of said indicating means.

2. Apparatus according to claim 2, whereas said indicating means comprises a graphic recording device connected to said amplifier means for recording said voltage variations.

3. Apparatus according to claim 1, an alarm device whereas said indicating means further comprises for producing an alarm signal when said thickness connected to said amplifier means detected exceeds predetermined limits.

* * * * *